(12) United States Patent
Kishan et al.

(10) Patent No.: US 10,606,653 B2
(45) Date of Patent: *Mar. 31, 2020

(54) EFFICIENT PRIORITY-AWARE THREAD SCHEDULING

(71) Applicant: Microsoft Technology Licensing, LLC, Redmond, WA (US)

(72) Inventors: Arun Upadhyaya Kishan, Kirkland, WA (US); Neill Michael Clift, Kirkland, WA (US); Mehmet Iyigun, Kirkland, WA (US); Yevgeniy Bak, Redmond, WA (US); Syed Aunn Hasan Raza, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/431,746

(22) Filed: Feb. 13, 2017

(65) Prior Publication Data

US 2017/0228260 A1 Aug. 10, 2017

Related U.S. Application Data

(63) Continuation of application No. 13/907,415, filed on May 31, 2013, now Pat. No. 9,569,260.

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
None
See application file for complete search history.

(56) References Cited

U.S. PATENT DOCUMENTS 5,826,081 A 10/1998 Zolnowsky
6,212,544 B1 4/2001 Borkenhagen et al.
(Continued)

OTHER PUBLICATIONS

"Final Rejection Issued in U.S. Appl. No. 13/907,415", dated Jan. 8, 2016, 18 Pages.

(Continued)

*Primary Examiner* — Kenneth Tang
(74) *Attorney, Agent, or Firm* — Workman Nydegger

(57) ABSTRACT

A priority-based scheduling and execution of threads may enable the completion of higher-priority tasks above lower-priority tasks. Occasionally, a high-priority thread may request a resource that has already been reserved by a low-priority thread, and the higher-priority thread may be blocked until the low-priority thread relinquishes the reservation. Such prioritization may be acceptable if the low-priority thread is able to execute comparatively unimpeded, but in some scenarios, the low-priority thread may execute at a lower priority than a medium-priority thread that also has a lower priority than the high-priority thread. In this scenario, the medium-priority thread is effectively but incorrectly prioritized above the high-priority thread. Instead, upon detecting this scenario, the device may temporarily elevate the priority of the lower-priority thread over the priority of the medium-priority thread until the lower-priority thread relinquishes the resource, thereby reducing the waiting period of the high-priority thread for the requested resource.

20 Claims, 7 Drawing Sheets

(56) References Cited

U.S. PATENT DOCUMENTS

| | | | |
|---|---|---|---|
| 6,567,839 | B1 | 5/2003 | Borkenhagen et al. |
| 6,785,889 | B1 | 8/2004 | Williams |
| 6,874,144 | B1 | 3/2005 | Kush |
| 7,219,347 | B1 | 5/2007 | Waddington |
| 7,802,057 | B2 | 9/2010 | Iyer et al. |
| 8,387,052 | B2 | 2/2013 | Dodge et al. |
| 8,863,140 | B2 | 10/2014 | Sistare |
| 9,569,260 | B2 * | 2/2017 | Kishan .................. G06F 9/5038 |
| 2001/0056456 | A1 | 12/2001 | Cota-Robles |
| 2002/0138679 | A1 | 9/2002 | Koning et al. |
| 2002/0178208 | A1 * | 11/2002 | Hutchison ................. G06F 9/52 |
| | | | 718/102 |
| 2004/0216112 | A1 * | 10/2004 | Accapadi .............. G06F 9/4881 |
| | | | 718/103 |
| 2005/0114857 | A1 * | 5/2005 | Chen ....................... G06F 9/524 |
| | | | 718/100 |
| 2006/0294522 | A1 | 12/2006 | Havens |
| 2009/0241119 | A1 | 9/2009 | Nemirovsky et al. |
| 2012/0222035 | A1 * | 8/2012 | Plondke ............... G06F 9/4881 |
| | | | 718/103 |
| 2012/0254882 | A1 | 10/2012 | Makljenovic et al. |
| 2013/0283285 | A1 | 10/2013 | Zhou et al. |

OTHER PUBLICATIONS

"Non Final Rejection Issued in U.S. Appl. No. 13/907,415", dated Jun. 15, 2016, 12 Pages.

"Non Final Rejection Issued in U.S. Appl. No. 13/907,415", dated May 28, 2015, 15 Pages.

"Notice of Allowance Issued in U.S. Appl. No. 13/907,415", dated Oct. 3, 2016, 5 Pages.

Baldwin, John H., "Locking in the Multithreaded FreeBSD Kernel", In Proceedings of the BSDCon Conference, Feb. 11, 2002, 9 Pages.

Helmy, et al., "Avoidance of Priority Inversion in Real Time Systems Based on Resource Restoration", In International Journal of Computer Science & Applications, vol. 3, Issue 1, Retrieved on: Mar. 22, 2013, pp. 40-50.

"International Search Report and Written Opinion of the International Searching Authority Issued in PCT Application No. PCT/US2013/060503", dated Feb. 4, 2014, 7 Pages.

Schrock, Eric, "Dynamic Lock Dependency Analysis of Concurrent Systems", A Thesis Submitted in Partial Fulfillment of the Requirements for Honors in the Department of Computer Science at Brown University, Sep. 2003, 74 Pages.

Steere, et al., "A Feedback-driven Proportion Allocator for Real-Rate Scheduling", In the Proceedings of the 3rd Symposium on Operating Systems Design and Implementation, Feb. 1999, 15 Pages.

Zheng, Haoqiang, "CPU Scheduling with Automatic Interactivity and Dependency Detection", In Doctoral Dissertation, Columbia University, Retrieved on: Mar. 22, 2013, 146 Pages.

"First Office Action and Search Report Issued in Chinese Patent Application No. 201380077079.1", dated Feb. 1, 2018, 12 Pages.

"Office Action Issued in European Patent Application No. 13773956.1", dated Jan. 25, 2018, 7 Pages.

* cited by examiner

EFFICIENT PRIORITY-AWARE THREAD SCHEDULING

CROSS-REFERENCE TO RELATED APPLICATIONS

This application is a continuation of, and claims priority under 35 U.S.C. § 120 to, U.S. patent application Ser. No. 13/907,415, also entitled "EFFICIENT PRIORITY-AWARE THREAD SCHEDULING," filed on May 31, 2013, the entirety of which is hereby incorporated by reference as if fully rewritten herein.

BACKGROUND

Within the field of computing, many scenarios involve a set of threads executing on a processor, where respective threads share a set of computing resources. For example, the time available by the processor may be shared among the set of threads, and network capacity may be divided among the threads that are endeavoring to send or receive data. Some resources may be reserved by a thread; e.g., a thread may lock a file or a section of memory in order to restrict access by other threads during a sensitive operation, such as writing data in a manner that reduces unintended overwriting by other threads. However, difficulties may arise if a high-priority thread requests access to a resource that has already been reserved by a low-priority thread. In such scenarios, the computing environment may block the execution of the high-priority thread until the low-priority thread relinquishes the reservation of the resource.

Additionally, in such scenarios, respective threads may include a priority that facilitates the sharing of computing resources. Such priorities may be utilized, e.g., to determine that a processor is to allocate a higher and earlier share of processing time to a higher-priority thread than a lower-priority thread, and/or that a request for access to a resource, such as network capacity or the use of a communications bus, is to be allocated to satisfy the tasks of a higher-priority thread before allocation to satisfy the tasks of a lower-priority thread.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A particular problem that may occur within thread scheduling and reservation of resources involves a high-priority thread having a comparatively high priority and a low-priority thread having a lower priority, where the low-priority thread acquires a reservation of a resource that is also requested by the high-priority thread. In such scenarios, the first, higher-priority thread is often blocked until the second, lower-priority thread relinquishes the reservation of the resource, and the higher-priority thread is then awarded a reservation of the resource. In order to reduce the waiting period of the higher-priority thread for the resources, it may be desirable to expedite the processing of the low-priority thread. In many such scenarios, this sequence of events is acceptable, because the blocking of the high-priority thread enables the low-priority thread to be executed unimpeded, thereby allocating a larger share of computational resources to the low-priority thread until its task is completed. However, in other scenarios, the low-priority thread may have a lower priority not just of the high-priority thread, but also of a medium-priority thread that is also executing within the computing environment. The computing environment may prioritize the execution of the medium-priority thread above the execution of the low-priority thread, due to the comparative priorities of the threads. However, if the medium-priority thread also has a lower priority than the high-priority thread, then the prioritization may result in the medium-priority thread consuming a larger share of resources than the low-priority thread during the reservation of the resource on which the high-priority thread is waiting, resulting in an effective and incorrect prioritization of the medium-priority thread over the high-priority thread.

Presented herein are techniques for scheduling threads for execution on a processor of a device in view of the resource reservations of such threads. In accordance with these techniques, for respective threads, the device may identify at least one resource reserved by the thread. Upon detecting that a high-priority thread is awaiting a selected resource that is reserved by a low-priority thread, and also that a medium-priority thread has a priority that is below the priority of the high-priority thread and above the priority of the low-priority thread, the device may elevate the priority of the low-priority thread above the medium-priority thread, and then schedule the execution of the threads according to the respective thread priorities. This scheduling may reduce the incidence of higher-priority threads that are awaiting access to resources that are in use by lower-priority threads, which in turn are scheduled at a lower priority than other threads that also have a lower priority than the blocked higher-priority thread, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
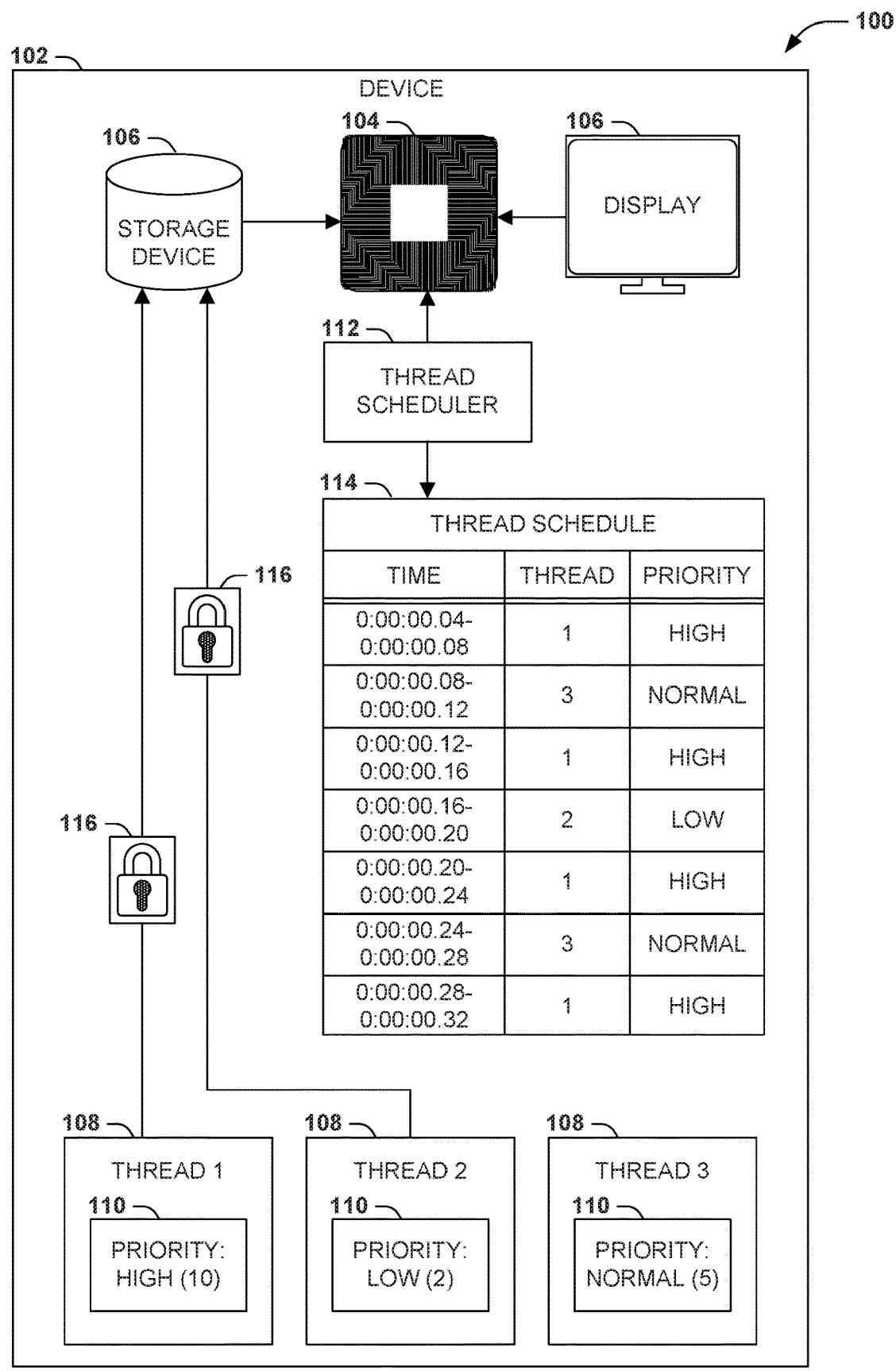
FIG. 1 is an illustration of an exemplary scenario featuring a scheduling of threads for execution on a processor and the reservation of resources within a computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario 100 featuring a device 102 including a processor 104 and a set of resources 106, such as a display and a storage device, that may be shared among a set of threads 108 executed on the processor 104. The threads 108 may be owned by different types of processes, such as kernel processes that provide low-level services such as memory management and security monitoring; device processes that manage access to a device, such as a display driver; and user processes that execute tasks on behalf of a user.

Within such scenarios, it may be possible to execute one or more threads 108 concurrently (e.g., the device 102 may comprise more than one processor 104, and/or respective processors may comprise multiple cores). Additionally, it may be desirable to enable a high-priority thread 108 to have priority over a low-priority thread 108; e.g., while concurrently executing a first process providing a user task, such as editing a text document, and a kernel process completing a time-sensitive task, such as streaming media to a media device, it may be desirable to shift processor time, memory, and other computing resources from the user process to the kernel process, because a brief processing delay in streaming media may be more noticeable or problematic than a brief processing delay in a text editing user interface.

In order to enable resource sharing, the device 102 may assign to each thread 108 a priority 110 indicating the priority of the thread 108 to consume resources relative to other threads 108 that may also be executing on the device 102. The priorities 110 may be assigned, e.g., as numeric scores, or as ordinal identifiers of the priority rank of the thread 108 with respect to other threads 108. A thread scheduler 112 may then generate a thread schedule 114 indicating, for respective blocks of time, which thread 108 is executed by the processor 104, wherein threads 108 having a higher priority 110 are allocated a larger share of time on the processor 104 than other threads 108. When the block of time on the processor 104 allocated to one thread 108 is completed, the processor 104 may perform a context switch (e.g., storing the values of registers used by the previous thread 108 and the call stack of the thread 108, selecting a low-priority thread 108, and loading into the registers the values and the call stack at the completion of a previous block of processor time for the low-priority thread 108). In this manner, the thread scheduler 112 may enable the threads 108 to share the processor 104 in a manner that prioritizes higher-priority threads 108 over lower-priority threads 108, and without causing any threads 108 to "starve" (e.g., allocating at least a small share of time on the processor 104 for even the lowest-priority threads 108).

Additionally, within the exemplary scenario 100 of FIG. 1, the resources 106 of the device 102 (optionally including the processor 104) may be subject to one or more reservations 116 requested by the threads 108. As a first example, a thread 108 may request a lock on a particular file stored in a storage device, such that the thread 108 may exclusively access the resource 106 while writing to the file, in order to restrict other threads 108 from overwriting the same file and causing a loss of data. As a second example, a thread 108 may request exclusive use of a communications bus, or a share of network bandwidth, in order to complete an operation having tight constraints, such as a Voice-over-IP (VoIP) session achieved over a network where inadequate resource availability may result in a noticeable reduction of the quality of service (QoS) of the session. Accordingly, when one or more threads 108 requests a reservation 116 for a resource 106, the device 102 may record the reservation 116 and grant access to the resource 106 only in accordance with the reservation 116. If a low-priority thread 108 requests access to a resources 106 that is unavailable due to one or more reservations 116 by other threads 108, the device 102 may temporarily suspend or block the execution of the low-priority thread 108 until one or more of the other threads 108 relinquishes its reservation 116 of the resource 106. A detected relinquishment may enable a fulfillment of the reservation 116 for the low-priority thread 108, which is unsuspended and permitted to continue executing with the reservation 116 of the resource 106.

In such scenarios, the reservation of resources 106 may result in a variance from a strict prioritization and scheduling of threads 108 according to priority 110. For example, a high-priority thread 108 and a low-priority thread 108 may be executing on the device 102, where the high-priority thread 108 has a higher priority 110 than the low-priority thread 108, and the device 102 may ordinarily scheduling of the execution of the high-priority thread 108 to occur more often than the execution of the low-priority thread 108. However, the low-priority thread 108 may acquire a first reservation 116 of a resource 106, and the high-priority thread 108 may subsequently request a second reservation 116 of the same resource 106. Moreover, interrupting the operation of the low-priority thread 108 may not be possible; e.g., many such reservations involve atomic operations that result in data loss or corruption if interrupted. Instead, the device 102 may suspend or block the high-priority thread 108 until the low-priority thread 108 has completed its access of the resource 106 and relinquished its reservation 116 of the resource 106.

B. Presented Techniques

In many instances, scheduling the execution of the low-priority thread 108 over the execution of the higher-priority thread 108 may occasionally be desirable and acceptable. For example, if the lower-priority thread 108 is permitted to utilize the reserved resource 106 in a comparatively unimpeded manner, then the lower-priority thread 108 may complete its operation rapidly, and the delay of the higher-priority thread 108 may be negligible. However, in some instances, such scheduling of threads 108 due to may result in an inefficient utilization of the resources 106 of the device 102 and avoidable delays in the execution of the threads 108. For example, while the low-priority thread 108 is utilizing the resource 106 and the high-priority thread 108 is suspended, a medium-priority thread 108 may also be executed by the device 102 that has a priority 110 that is lower than the priority 110 of the high-priority thread 108, but that is higher than the priority 110 of the low-priority thread 108. Accordingly, the thread scheduler 112 may refrain from executing the high-priority thread 108 while awaiting the relinquishment of the reservation 116 of the resource 106 by the low-priority thread 108, but may also prioritize the execution of the medium-priority thread 108 over the low-priority thread 108 due to its higher priority 110. Accordingly, the operation of the medium-priority thread 108 may delay the completion of the task of the low-priority thread 108, its relinquishment of the reservation 116 of the resource 106, and the resumption of the high-priority thread 108. This interaction results in an effective prioritization of the medium-priority thread 108 over the high-priority thread 108, despite the high-priority thread having a higher priority than the medium-priority thread 108.

Many techniques may be devised to reduce these and similar scheduling problems. However, many such techniques may be computationally expensive. For example, a scrupulous reservation tracking system may utilize some complex logic in order to fulfill any request for a reservation 116 of a resource 106 by a thread 108. However, tradeoffs may exist in the efficiency gains of scrupulous tracking techniques as compared with the computational expenses involved. For example, maintaining a global record of every reservation 116 of every resource 106 may also involve a reservation process 116 for updating the global record; e.g., in order to award a reservation 116 of a resource 106 to a thread 108, the device 102 may first have to acquire a reservation of the global reservations record in order to record the reservation 116, and may have to lock the global reservations record again when the reservation 116 is relinquished. Updating the global reservation record therefore impose a cost in computational resources that reduces, or even exceeds, the efficiency gains of such reservation-aware thread scheduling. Accordingly, the particular technique selected for prioritizing the threads 108 may significantly affect the efficiency of the device 102.

Figure 2:
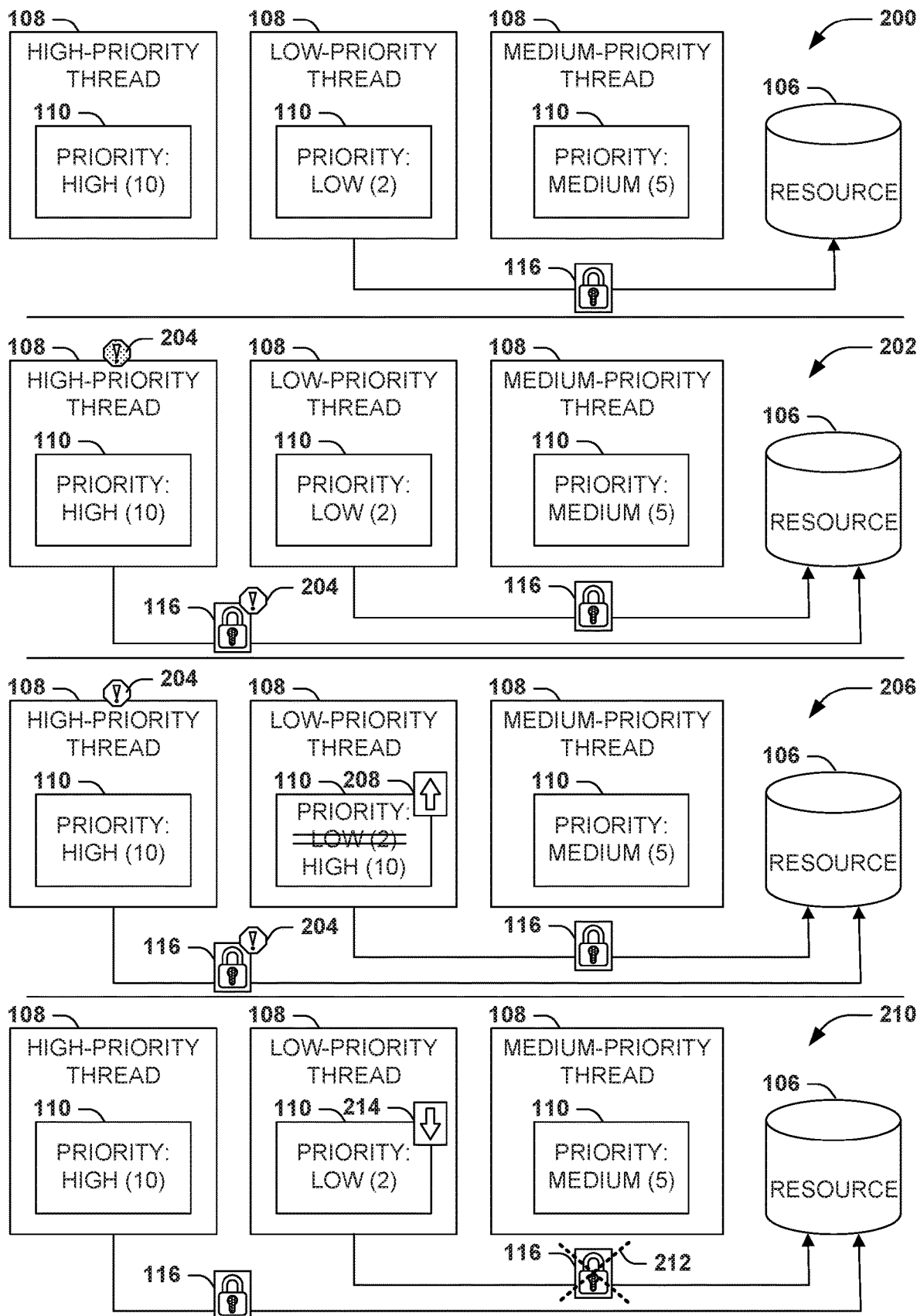
FIG. 2 is an illustration of an exemplary scenario featuring a scheduling of threads for execution on a processor and the reservation of resources within a computing environment in accordance with the techniques presented herein.

FIG. 2 presents an exemplary technique for prioritizing the execution of threads that may enable a reduction or avoidance of inefficient thread prioritization. In this exemplary scenario, three threads 108 are executing on the device 102: a high-priority thread 108 having a first (comparatively high) priority 110; a low-priority thread 108 having a second (comparatively low) priority 110; and a medium-priority thread 108 having a third (comparatively average) priority 110. At a first time 200, the low-priority thread 108 may acquire a reservation 116 of a resource 106, such as a lock on a file or permission to access a memory buffer of a display adapter. Because the resource 106 has not been reserved by any other thread 108, the device 102 may award a reservation 116 to the high-priority thread 108. At a second time 202, the high-priority thread 108 may request a reservation 116 of the same resource 106, and the device 102 may suspend 204 the high-priority thread 108 pending the relinquishment of the reservation 116 of the resource 106 by the high-priority thread 108. However, a task scheduler 112 of the device 102 may also be configured to prioritize the execution of the medium-priority thread 108 over the low-priority thread 108, and, by extension, over the resumption of the high-priority thread 108, due to the higher priority 110 of the medium-priority thread 108 over the low-priority thread 108. Accordingly, at a third time 206, the device 102 may detect this scenario, and may temporarily elevate 208 the priority 110 of the low-priority thread 108 over the priority 110 of the medium-priority thread 108 in order to expedite the completion of the task for which the low-priority thread 108 has reserved the resource 106. At a fourth time 210, when the low-priority thread 108 relinquishes 212 the reservation 116 of the resource 106, the device 102 may award the reservation 116 of the resource 106 to the high-priority thread 108, and may resume the execution of the high-priority thread 108. Additionally, the device 102 may reduce 214 the priority 110 of the low-priority thread 118 to its value before the elevation at the third time point 206. By adjusting the priorities 110 of the threads 108 in this manner, the techniques illustrated in the exemplary scenario of FIG. 2 may reduce inefficiencies caused by thread scheduling due to the reservation of resources in accordance with the techniques presented herein.

C. Exemplary Embodiments

Figure 3:
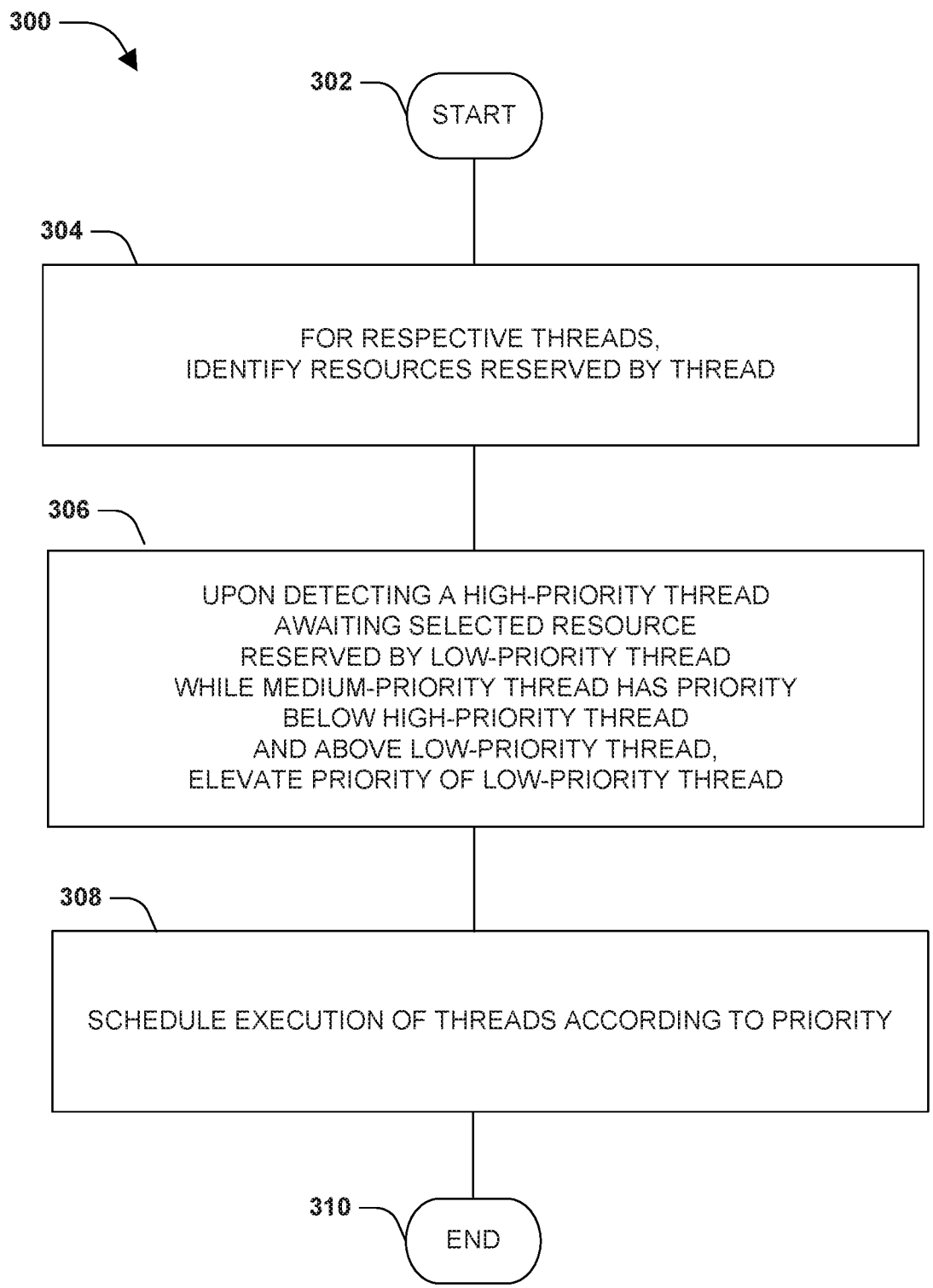
FIG. 3 is an illustration of an exemplary method of prioritizing threads for execution on a processor of a device in accordance with the techniques presented herein.

FIG. 3 presents a first exemplary embodiment of the techniques presented herein, illustrated as an exemplary method 300 of prioritizing threads 108 respectively having a priority 110 and executing on a processor 104 of a device 102. The exemplary method 300 may be implemented, e.g., as a set of instructions stored in a memory component of the device 102, such as a memory circuit, a platter of a hard disk drive, a solid-state storage device, or a magnetic or optical disc, and organized such that, when executed by the device 102 (e.g., on a processor of the device 102), cause the device 102 to operate according to the techniques presented herein. The exemplary method 300 begins at 302 and involves, for respective threads 108, identifying 304 at least one resource 106 reserved by the thread 108. The exemplary method 300 also involves, upon detecting a high-priority thread 108 awaiting a selected resource 106 that is reserved by a low-priority thread 108 while a medium-priority thread 108 has a priority 110 that is below the priority 110 of the high-priority thread 108 and above the priority 110 of the low-priority thread 108, elevating 306 the priority 110 of the low-priority thread 108 above the priority 110 of the medium-priority thread 108. The exemplary method 300 also involves scheduling 308 the execution of the threads 108 on the processor 104 according to the priorities 110. In this manner, the exemplary method 300 achieves the prioritization and execution of threads 108 according to the respective priorities 110 of the threads 108 and also the reservations 116 of the resources 106 in accordance with the techniques presented herein, and so ends at 310.

Figure 4:
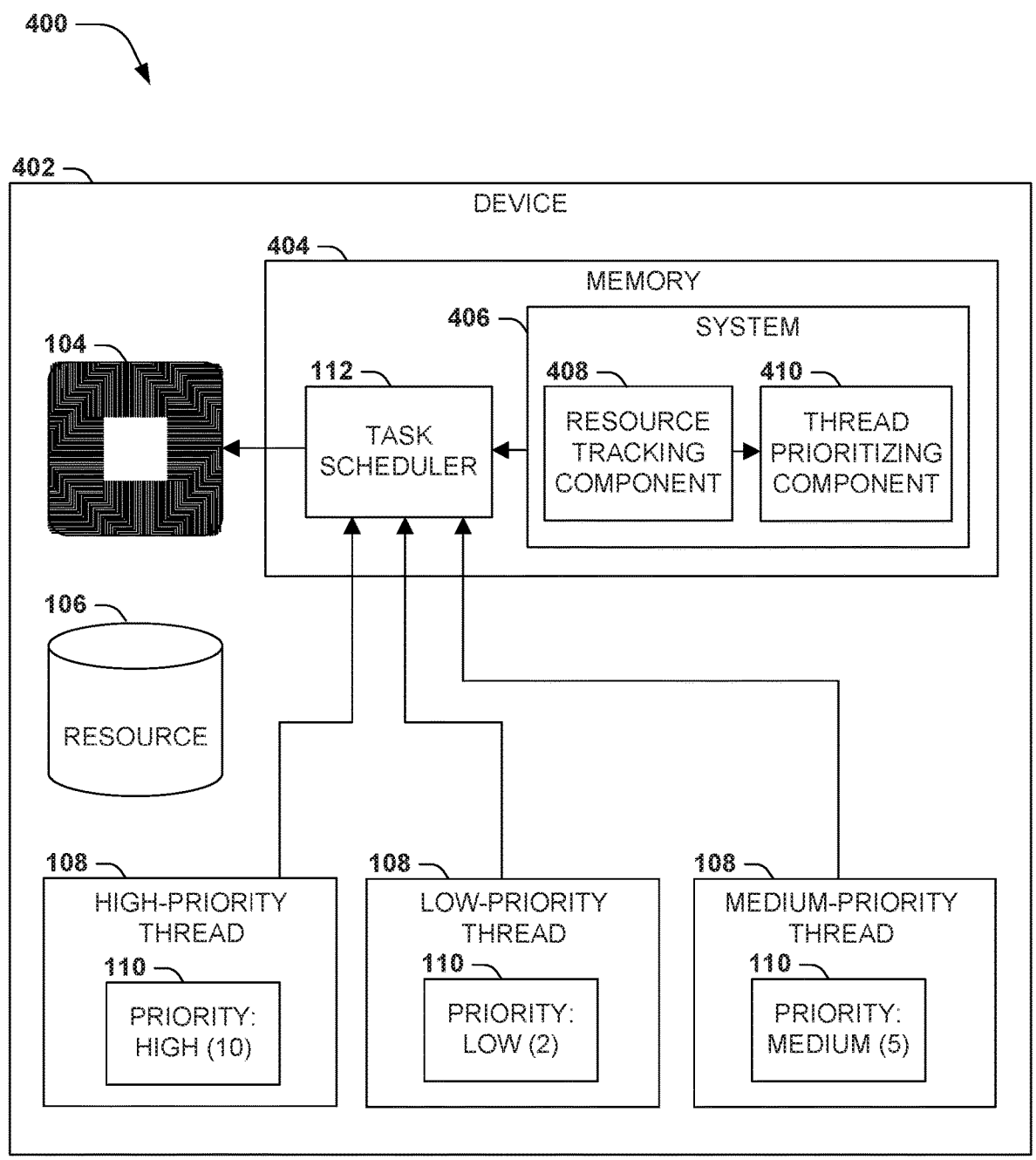
FIG. 4 is a component block diagram illustrating an exemplary system for prioritizing threads for execution on a processor of a device in accordance with the techniques presented herein.

FIG. 4 presents a second exemplary embodiment of the techniques presented herein, illustrated as an exemplary scenario 400 featuring an exemplary system 406 configured to prioritize threads 108 respectively having a priority 110 for execution on a processor 104 of a device 402 having a memory 404 and a task scheduler 112. Respective components of the exemplary system 406 may be implemented, e.g., as a set of instructions stored in the memory 406 of the device 402 and executable on a processor 104 of the device 402, such that the interoperation of the components causes the device 402 to operate according to the techniques presented herein. The exemplary system 406 includes a resource tracking component 408, which is configured to track the reservations 116 of the resources 106 of the device 402 by respective threads 108 executing thereupon. The exemplary system 406 also includes a thread prioritizing component, which is configured to, upon detecting a resource 106 that is reserved by a low-priority thread 108 and awaited by a high-priority thread 108 having a priority 110 above the priority of the low-priority thread 108, and upon further detecting a medium-priority thread 108 scheduled for execution and having a priority 110 above the priority 110 of the low-priority thread 108 and below the priority 110 of the high-priority thread 108, elevate the priority 110 of the low-priority thread 108 above the priority 110 of the medium-priority thread 108. In this manner, the exemplary system 406 achieves the configuration of the device 402 to prioritize the execution of threads 108 by the processor 104 and the task scheduler 112 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
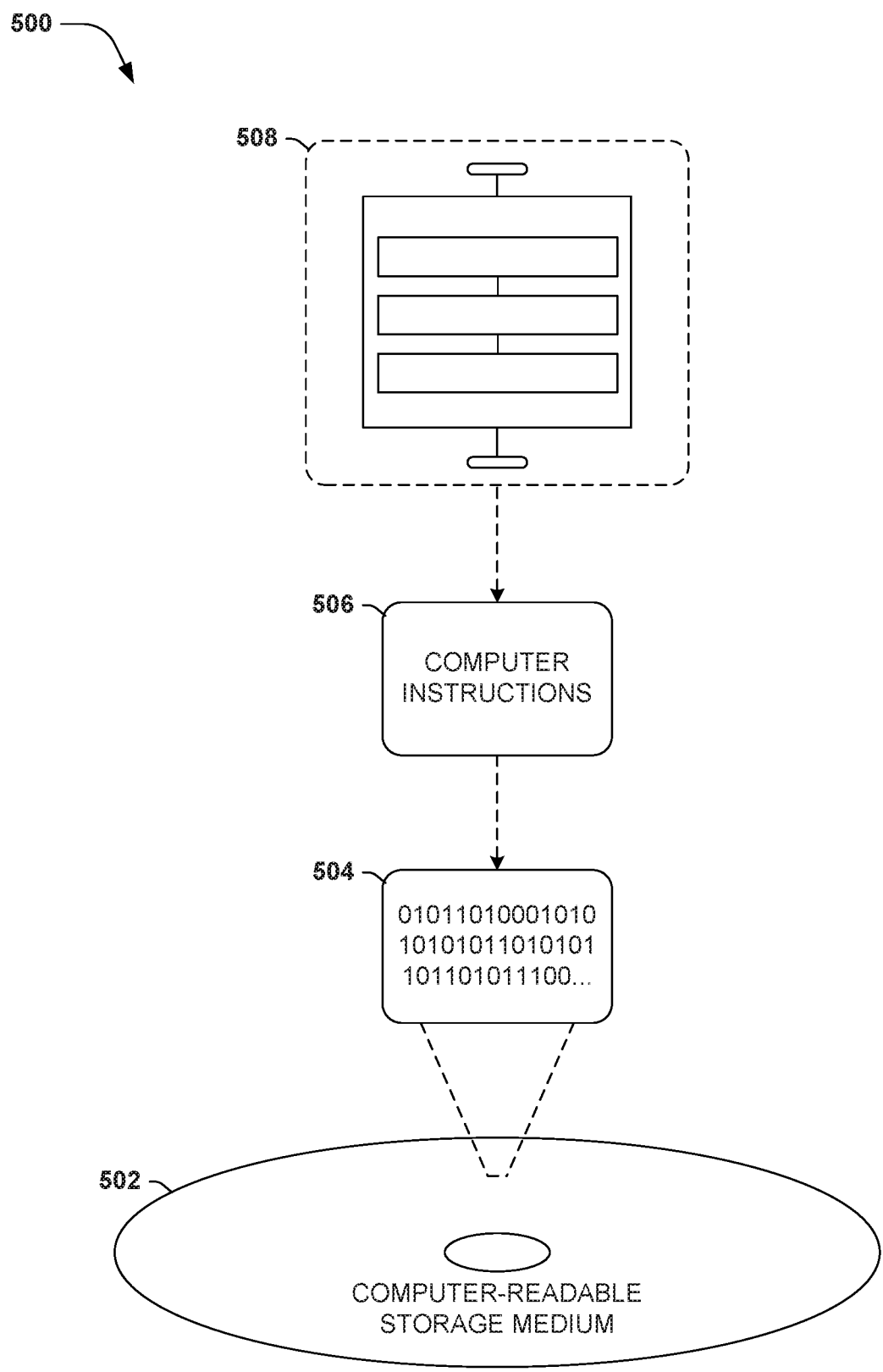
FIG. 5 is an illustration of an exemplary computer-readable medium including processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of prioritizing the execution of threads 1108 on a device 102 in view of the reservations 116 of the resources 106 of the device 102 by such threads 108, such as the exemplary method 300 of FIG. 3. In another such embodiment, the processor-executable instructions 506 may be configured to implement a set of components that together provide a system for prioritizing the execution of threads 1108 on a device 102 in view of the reservations 116 of the resources 106 of the device 102 by such threads 108, such as the exemplary system 406 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and/or the exemplary system 406 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 102, such as servers, server farms, workstations, laptops, tablets, mobile phones, game consoles, and network appliances. Such devices 102 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the techniques presented herein may involve the monitoring of many types of reservations 116 of many types of resources 106. As a first example, the resources 106 may comprise, e.g., execution time on one or more processors 104; a requested or detected affinity of a thread 108 for a particular processor 104 or processor core; an allocation of memory in a volatile memory circuit (such as system RAM) or a nonvolatile storage device (such as a hard disk drive); an allocation of bandwidth in a communication bus or network connection; and/or access to one or more hardware or software components of the device 102. As a second example, the reservations 116 of the resources 106 may comprise, e.g., a reserved allocation of a portion of the capacity of the resource 106 (e.g., a reservation of a block of memory or a share of network bandwidth); exclusive access to the resource 106; and/or participation in a limited shared access of the resource 106, such as through a semaphore. As a third example, the resources 106 may comprise a particular task or operation performed by the low-priority thread 108 on which the high-priority thread 108 is awaiting completion before performing subsequent processing.

As a third variation of this first aspect, the priorities 110 of respective threads 108 may be identified and assigned in various ways. As a first example, the priorities 110 may comprise relative numerical scores, where a higher priority score of a high-priority thread 108 denotes a higher priority 110 than a lower priority score of a low-priority thread 108. As a second example, the priorities 110 may have semantic significance, such as an identification of the role of the thread 108 (e.g., kernel threads 108 may be assigned a first priority 110; device driver threads 108 may be assigned a second priority 110; and user threads 108 may be assigned a third priority 110) and/or the significance of the task performed by the thread 108 (e.g., threads 108 performing a time-sensitive task may request and receive comparatively higher priority 110 than threads 108 performing time-insensitive tasks). As a third example, the device 102 may select the priorities 110 of the threads 108 based on roles or activities (e.g., adjusting the priorities 110 of the threads 108 while monitoring the performance of the device 102). Alternatively, the priorities 110 may be specified by the threads 108 and/or selected by a user of the device 102.

As a fourth variation of this first aspect, the priorities 110 of the threads 108, adjusted in accordance with the techniques presented herein, may be usable by the device 102 in many ways. As a first example, the device 102 may choose a thread schedule 114 for the threads 108 executing on the device 102 in view of the priorities 110 of the threads 108. As a second example, the device 102 may award reservations 116 based on the priorities 110 of the threads 108 (e.g., if two threads 108 concurrently request a reservation 116 of a resource 106, the device 102 may award the reservation 116 first to the thread 108 having a higher priority 110). As a third example, the device 102 may manage the allocated resources of the threads 108 in accordance with the priority 110 (e.g., if a memory shortage prompts a deferral or termination of one or more threads 108, the threads 108 having lower priority 110 may be selected for deferral or termination before threads 108 having a higher priority 110). These and other scenarios may be suitable for implementations of the techniques presented herein.

D2. Tracking Reservations

A second aspect that may vary among embodiments of these techniques relates to the tracking of resources 106 and reservations 116 thereof.

As a first variation of this second aspect, the reservations 116 of resources 106 may be detected in an ad hoc manner, e.g., by examining and/or querying the threads 108 to determine the reservations 116 held by each thread 108, or by monitoring the interactions of the threads 108 and resources 106.

As a second variation of this second aspect, the device 102 may include a reservation record where the reservations 116 of resources 106 by threads 108 are recorded. Additionally, the reservation record may be generated as a data structure facilitating lookup of reservations 116 and/or associated threads 108. A forest of binary trees may be feasible for this role, as each binary tree may be rebalanced upon detecting an imbalance in the binary tree comprising the reservation record (particularly if the binary tree is amenable to consistent lookup time and/or rapid rebalancing, such as a partitioned red/black tree). In an embodiment, a first binary tree identifies the threads 108 that have reservations 116 for a particular resource 106, and a second binary tree identifies the threads 108 that are awaiting a reservation 116 for the resource 106. As a second example, the set of threads 108 that have reserved and/or are awaiting reservations for the respective resources 106 may be stored in a data structure, such as a linked list, which may present greater lookup efficiency and consistency in the reservation mechanism than techniques that utilize recursion to inspect the graph of reservations 116, which may consume a significant portion of the call stack in scenarios involving complex, interrelated graphs of references.

In variations involving a reservation record, the manner of recording the reservations 116 in the reservation record may significantly affect the performance of the device 102. For example, a scrupulous and comprehensive recording process may involve recording each reservation 116 in the reservation record promptly upon awarding the reservation 116 to a thread 108. However, scrupulous and comprehensive recording may be inefficient in several respects. As a first example, mechanisms for recording every thread interaction in a centralized reservation record may have significant difficulties with concurrency in the updating of the reservation record (e.g., devices 102 featuring an abundance of executing threads 108; devices 102 featuring a high degree of concurrently executing threads 108, such as devices 102 with large numbers of processing and/or processing cores; and computing environments where reservations 116 are frequently requested and released). The concurrency of accessing the reservation record may consume a significant amount of computational resources (including the complexity and delay in requesting, receiving, and/or relinquishing a reservation 116), and may occasionally create additional processing bottlenecks that reduce or exceed the potential efficiency gains of the reservation tracking mechanism. As a second example, scrupulous and comprehensive recording may result in computational work for many reservations 116 that are unlikely to present opportunities for adjustments that yield higher efficiency or performance. Examples of such scenarios include the reservation 116 of a resource 106 only by one thread 108; the acquisition and relinquishing of a reservation 116 in a short period of time, such as within the same processing cycle; and reservations 116 for resources 106 that are held by a lower-priority thread 108 and awaited by a higher-priority thread 108 with no other threads 108 having priority that may preempt the lower-priority thread 108, wherein the resource conflict is resolvable simply by allowing the lower-priority thread 108 to run to completion and relinquish the reservation.

In view of these observations, a set of second variations of this second aspect involve reservation recording techniques relating to the usage of the reservation record. Rather than providing a scrupulous, comprehensive documenting of reservations 116, the device 102 may conservatively utilize the reservation record to focus on the reservations 116 are likely to provide opportunities for adjustments resulting in greater efficiency.

As a first example of this second variation of this second aspect, the recording of reservations 116 may occur outside of the actual reservation 116 of the resource 106 in order to reduce the duration of the reservation 116; e.g., the recording of an awarded reservation 116 in the reservation record may be performed before providing the reservation 116 to the low-priority thread 108, and/or the relinquishing of the awarded reservation 116 may be performed after the reservation 116 has been relinquished.

As a second example of this second variation of this second aspect, the reservation record may be utilized only for scenarios where the selected resource 106 has been and/or is soon likely to be requested by a low-priority thread 108 (and, optionally, more particularly detecting that the subsequent request is received from a high-priority thread 108 having a higher priority than the low-priority thread 108).

As a third example of this second variation of this second aspect, incidents wherein lower-priority threads 108 reserve selected resources 106 that are not awaited by a higher-priority thread 108 may be recorded in an internal reservation record owned by the thread 108, and may be transferred to a centralized reservation record only upon detecting that a higher-priority thread 108 is awaiting the selected resource 106.

As a fourth example of this second variation of this second aspect, the recording of reservations 116 by a low-priority thread 108 may be deferred until the run cycle of the thread 108 is complete, e.g., when the device 102 is about to perform a context switch away from the low-priority thread 108. This deferral may reduce the recording of reservations 116 that are acquired and relinquished so promptly that it is unlikely that higher-priority threads may be significantly delayed by the reservation 116 by the lower-priority thread 108. Using these and other techniques, the device 102 may access the reservation record conservatively, e.g., avoiding the recording of reservations 116 that are unlikely to provide opportunities for priority adjustments that result in higher efficiency, in order to reduce the computational resources involved in the recording. Those of ordinary skill in the art may devise many techniques for efficiently tracking reservations 116 of resources 106 in embodiments of the techniques presented herein.

D3. Priority Elevation

A third aspect that may vary among embodiments of these techniques relates to the elevation of priorities 110 of threads 108 in order to alleviate resource conflicts involving reservations 116 of resources 106.

As a first variation of this third aspect, the elevation of priority 110 of one or more threads 108 may be reserved for scenarios potentially enabling in greater efficiency. For example, when a lower-priority thread 108 is detected to have a reservation 116 of a resource 106 that is awaited by a higher-priority thread 108, it may be determined that the elevation of priority only results in greater efficiency if a medium-priority thread 108 is scheduled for execution that may delay the completion of the low-priority thread 108 (and the resulting relinquishing of the reservation 116 and the resumption of the higher-priority thread 108); and, additionally, the medium-priority thread 108 has a higher priority than the second, lower-priority thread 108 and a lower priority 110 than the first, higher-priority thread 108.

As a second variation of this third aspect, the elevation of priority 110 of one or more threads 108 may be performed during a context switch, For example, upon context-switching away from the high-priority thread 108 (and in an embodiment, upon context-switching away from the high-priority thread 108 that is blocked and awaiting a reservation 116 of a resource 106), the device 102 may identify the resources 106 awaited by the high-priority thread 108, and one or more low-priority threads 108 that have a reservation 116 for the selected resources 106; and at least one medium-priority thread 108 having a priority 110 that is above the priority 110 of the high-priority thread 108 and below the priority 110 of the low-priority thread 108. The context switch away from the high-priority thread 108 may present a convenient opportunity for performing this extensive evaluation and elevating the priority 110 of the low-priority thread 108 above the medium-priority thread 108, e.g., because the interruption of the high-priority thread 108 due to the blocking request for a reservation 116 of the selected resource 106 entails a delay in the operation of the high-priority thread 108, and performing this evaluation may provide a small increase in computational evaluation in exchange for a potentially significant expedition of the low-priority thread 108 through the elevation of priority 110 and a potentially significant gain in efficiency. Additionally, the elevation of priority 110 may reflect the priority 110 of the high-priority thread 108 at various times; e.g., the elevation of the priority 110 of the low-priority thread 108 may reflect the priority 110 of the high-priority thread 108, even if the priority 108 of the high-priority thread 108 changes. For example, if the priority 110 of the low-priority thread 108 is elevated at a first time to the priority 110 of the low-priority thread 108, and subsequently the priority 110 of the high-priority thread 108 is later increased (e.g., if the high-priority thread 108 comprises a memory reclaiming process such as a garbage collector, and the device 102 later encounters a significant shortage of memory), the priority 110 of the low-priority thread 108 may be further elevated to reflect the elevation of priority 110 of the high-priority thread 108.

As a third variation of this third aspect, the elevation of priority 110 of the low-priority thread 108 may be achieved in various ways. As a first such example, the priority 110 of the low-priority thread 108 may be set at least as high as the priority 110 of the high-priority thread 108, or just above the priority 110 of the medium-priority thread 108. As a second such example, the priority 110 of the low-priority thread 108 may be elevated only briefly (e.g., only for one run cycle, as a temporary adjustment of priority 110 in case the low-priority thread 108 is capable of completing the task and promptly relinquishing the reservation 116 of the resource 106), and/or may be maintained through at least one subsequent context switch (e.g., potentially expediting the completion of the low-priority thread 108 by a significant extent in the case of long-running tasks). As a third such example, the elevation of priority 110 of the low-priority thread 108 may be reduced promptly after detecting that the low-priority thread 108 has relinquished the reservation 116 of the resource 106, or may be maintained for a brief or extended duration (e.g., in case the low-priority thread 108 promptly reacquires the reservation 116 of the resource 106, or in case the low-priority thread 108 performs tasks on at least one related resource 116 that has been or may promptly be requested by the high-priority thread 108). As another alternative, the priority 110 may be briefly reduced even below the initial priority 110 of the low-priority thread 108, e.g., in order to provide a comparatively consistent amount of priority 110 to the low-priority thread 108 over time.

As a fourth variation of this third aspect, in some scenarios, respective threads 108 may have different types of priority 110 for different types of resource access to different types of resource 106. For example, a thread 108 may have a first priority 110 identifying the priority of the thread 108 to lock one or more files of a file system; a second priority 110 identifying the priority of the thread 108 to execute on the processor 104; and a third priority 110 identifying the priority of the thread 108 to communicate over and/or reserve bandwidth for a communications bus or network. As a first example of this fourth variation of this third aspect, while elevating the priority 110 of a thread 108 in order to expedite the relinquishing of a reservation 116 on a selected resource 106 having a selected resource type (e.g., write access to a file; memory interaction with a component, such as a display adapter; or communication over a communications bus or network), the device 102 may specifically elevate the resource access type priority for the access type of the selected resource 106 (e.g., elevating only the priority 110 of the thread 108 for accessing the network for which the thread 108 has a reservation and that is awaited by a higher-priority thread 108). Alternatively, the device 102 may elevate the priority 110 of the thread 108 for one or more other resource access type priorities, e.g., so that the thread 108 may utilize any resources 106 involved in the completion of the task on the selected resource 106 and the relinquishing of the reservation 116. For example, the high-priority thread 108 may be awaiting access to a file that is exclusively locked by the low-priority thread 108 for transmission over a network. Because the completion of the transmission may be affected both by the priority of the low-priority thread 108 in accessing the file (determined according to a file access type priority) as well as the priority of the low-priority thread 108 in transmitting data over the network (determined according to a network access type priority), the device 102 may elevate both the file access type priority and the network access type priority of the low-priority thread 108, even though only the reservation of the file directly relates to the suspension of the high-priority thread 108.

As a fifth variation of this third aspect, the elevation of priority 110 may be applied selectively to the low-priority thread 108, e.g., by elevating the priority 110 with respect to operations of the low-priority thread 108 involving the selected resource 106 (and refraining from elevating the priority of other operations of the low-priority thread 108 that does not involve the selected resource 106). Such selective elevation of priority 110 may also be applied retroactively, e.g., by elevating the priority 110 of an operation of the low-priority thread 108 that was initiated prior to the detection of the first, higher-priority thread 108 awaiting the selected resource 106 and/or the medium-priority thread 108 having a higher priority 110 than the low-priority thread 108.

As a sixth variation of this third aspect, in some scenarios, the completion of the low-priority thread 108, and the relinquishing of the reservation 116 of the resource 106 that the high-priority thread 108 is awaiting, may be further contingent on the completion of yet another thread 108 having reserved a second resource 106 that the low-priority thread 108 is awaiting. In such scenarios, the elevation of priority 110 of the low-priority thread 108 may be inadequate for expediting the relinquishing of the reservation 116 of the resource 106, because the low-priority thread 108 is also suspended pending completion of the other thread. Accordingly, in an embodiment, elevating the priority 110 of the low-priority thread 108 may further involve detecting that the low-priority thread 108 is awaiting a second resource 106 that is reserved by a fourth thread 108 having a priority 110 below the priority 110 of the medium-priority thread, and therefore elevating the priority 110 of the fourth thread 108 above the priority of the medium-priority thread 108 in order to facilitate its completion and relinquishing of the reservation 116 of the second resource 106. In a further embodiment, the device 102 may first elevate the priority 110 of the fourth thread 108, and, upon detecting a relinquishing of the reservation 116 of the second selected resource by the fourth thread 108, may reduce the priority 110 of the fourth thread 108 and also elevate the priority 110 of the low-priority thread 108. In this manner, the prioritization of the threads 108 may involve an evaluation of a dependency chain involving a set of threads 108, and the sequential elevation of priority 110 of each thread 108 at the end of the dependency chain in order to expedite its completion and the resumption of a preceding thread 108 of the dependency chain (for which the priority 110 is next elevated, etc.) In this manner, the device 102 may resolve a chain of reservation requests involving a set of resources 106 in a manner that expedites the completion of the tasks of the threads 108 higher up the dependency chain.

Figure 6:
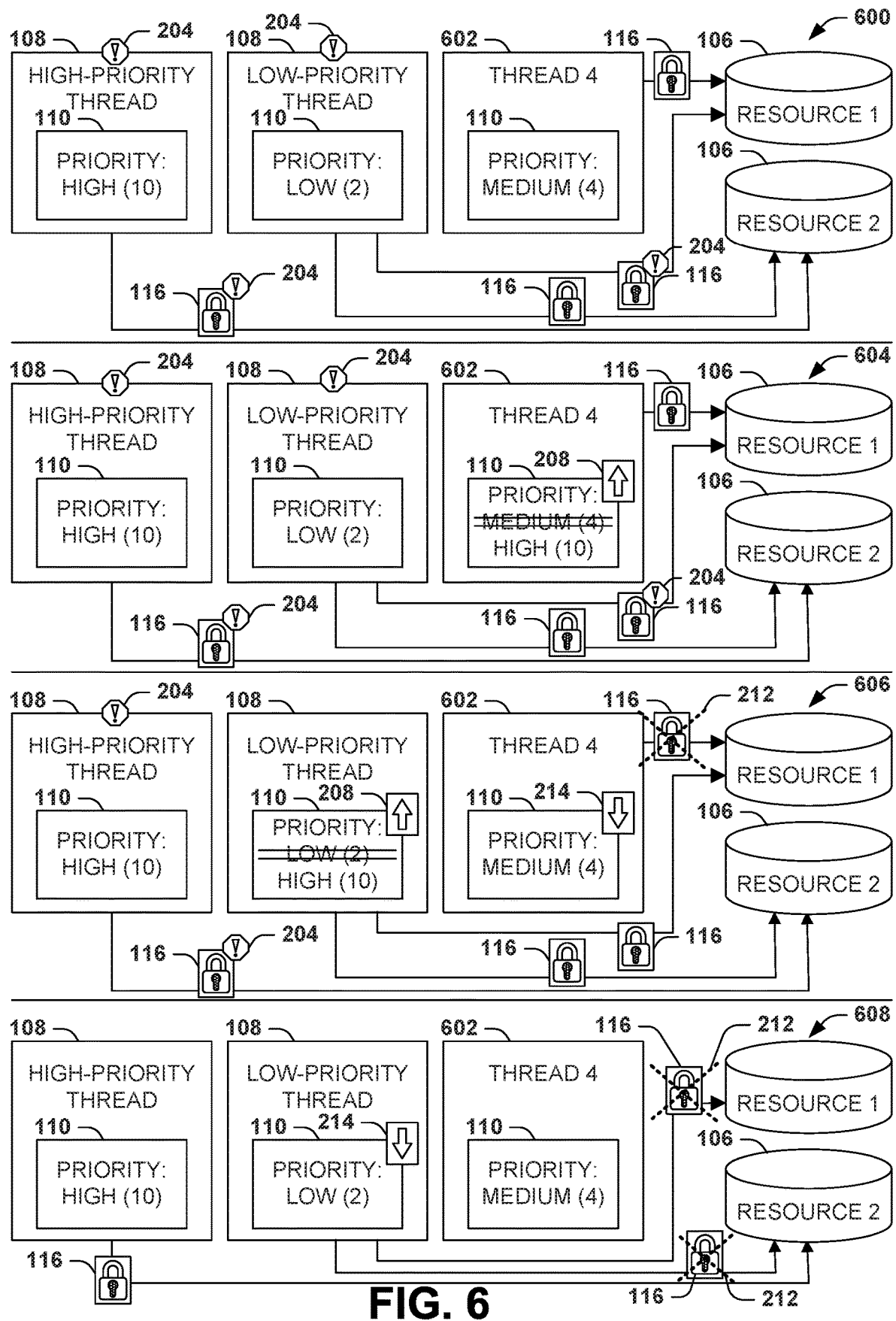
FIG. 6 is an illustration of another exemplary scenario featuring a scheduling of threads for execution on a processor and the reservation of resources within a computing environment in accordance with the techniques presented herein.

FIG. 6 presents an illustration of an exemplary scenario featuring an incremental tracking of a dependency chain. In this exemplary scenario, four threads 108 are executing on a device 102 (including a medium-priority thread 108 that is not shown), wherein the high-priority thread 108 has a high priority 110, the low-priority thread 108 has a low priority 110, and the fourth thread 602 has a medium priority 110 (but lower than the medium priority 110 of the medium-priority thread 108), and wherein the threads 108 are interacting with two resources 106. At a first time 600, the high-priority thread 108 has requested a reservation 116 of the second resource 106 for which a reservation 116 has already been awarded to the low-priority thread 108, and accordingly, the high-priority thread 108 is suspended 204 pending the low-priority thread 108 relinquishing the reservation 116 of the second resource 106. However, the low-priority thread 108, in turn, has also requested a reservation 116 of a first resource 106 (e.g., in order to copy a file form the a first storage device to a second storage device), but a reservation 116 for the first storage device has previously been awarded to the fourth thread 602, resulting in the low-priority thread 108 also being suspended 204. Because the fourth thread 602 has a lower priority 110 than the medium-priority thread 108, the medium-priority thread 108 is scheduled with priority 110 over the fourth thread 602, causing a protracted delay in completing the low-priority thread 108 and, by extension, the high-priority thread 108. In order to resolve this dependency chain, at a second time 604, the priority 110 of the fourth thread 602 may be elevated 208 (e.g., to the level of the priority 110 of the high-priority thread 108) in order to expedite the completion of the fourth thread 602 by temporarily awarding priority 110 over the medium-priority thread 108. At a third time point 606, when the fourth thread 602 relinquishes 212 its reservation 116 of the first resource 106, the device 102 may then reduce 214 the priority 110 of the fourth thread 602, and may also elevate 208 the priority 110 of the low-priority thread 108 (e.g., to the level of the priority 110 of the high-priority thread 108). The low-priority thread 108 then has reservations 116 on both the first resource 106 and the second resource 106, and may execute with elevated priority 110 in order to complete the task involving both of the resources 106. At a fourth time 608, the low-priority thread 108 may have completed its task and relinquished 212 the reservations 116 of both resources 106; accordingly, the priority 110 of the low-priority thread 108 may be reduced 214, and the high-priority thread 108 may execute at its priority 110 with the reservation 116 of the second resource 106. In this manner, the threads 108 executing on the device 102 may be scheduled in order to alleviate the dependency chain and resume the scheduling of the threads 108 according to the respective priorities 110 in accordance with the techniques presented herein.

E. Computing Environment

Figure 7:
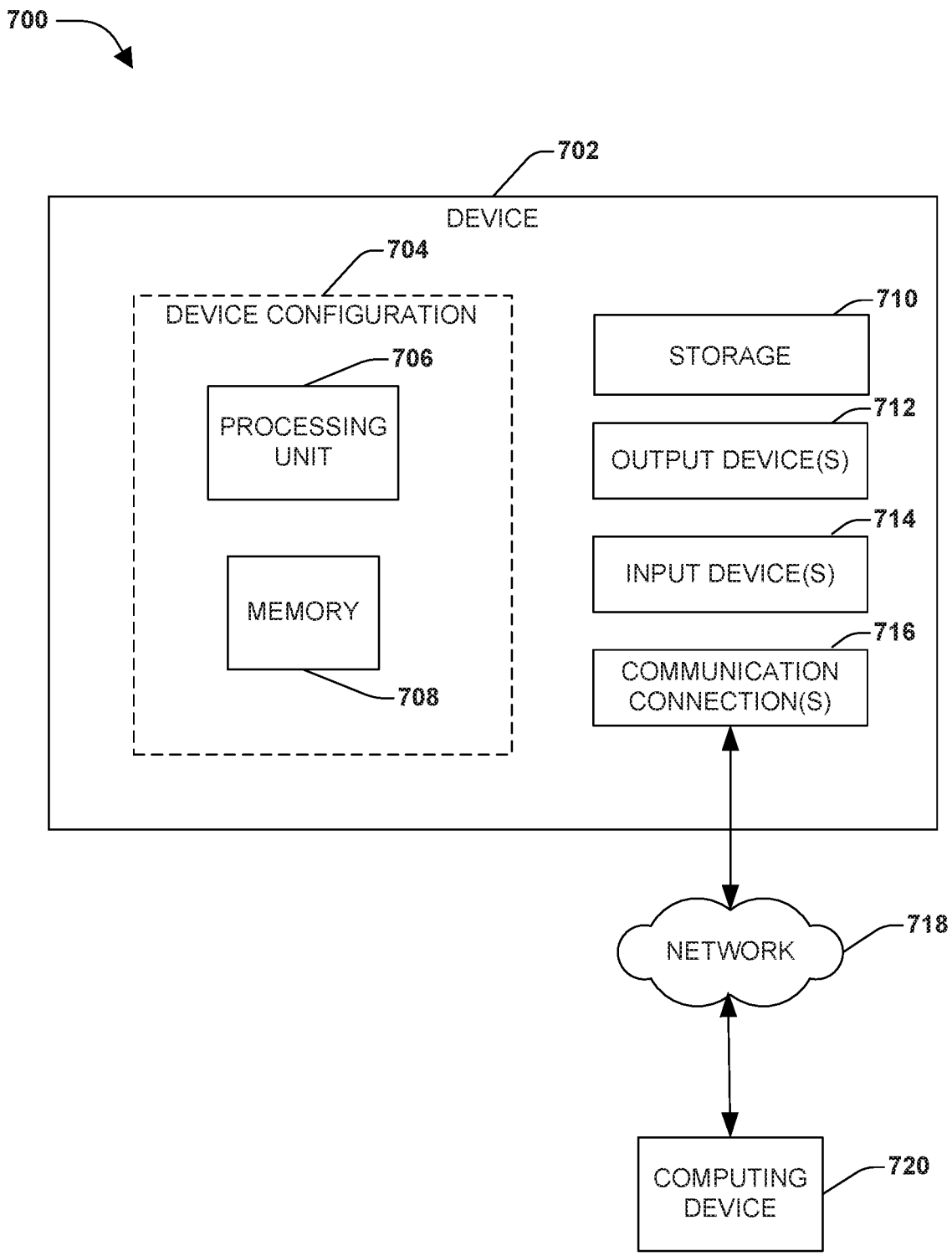
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of prioritizing a plurality of threads, including at least a first thread, a second thread, a third thread, and a fourth thread, each of which is owned by a process and available for being scheduled to be executed on a processor of a device and has a respective priority, the priority of the first thread being higher than the priority of the second thread, the priority of the second thread being higher than the priority of the third thread, and the priority of the third thread being higher than the priority of the fourth thread, the method comprising:
    allocating a reservation of a first resource to the third thread;
    during the reservation of the first resource by the third thread, receiving a request from the fourth thread for the first resource;
    allocating a reservation of a second resource to the fourth thread;
    during the reservation of the second resource to the fourth thread, receiving a request from the first thread for the second resource;
    detecting a resource conflict comprising a delayed release of the reservation of the second resource by the execution of the fourth thread while the request for the second resource by the first thread is pending; and
    addressing the resource conflict by:
        temporarily elevating the priority of the third thread to a priority that is higher than the priority of the second thread, such that the third thread is scheduled to be executed prior to the second thread;
        in response to the third thread relinquishing the first resource, temporarily elevating the priority of the fourth thread to a priority that is higher than the priority of the second thread, such that the fourth thread is scheduled to be executed prior to the second thread; and
        in response to the fourth thread relinquishing the second resource, schedule the first thread to be executed prior to the second thread.

2. The method of claim 1, wherein:
    the device further comprises a reservation record; and
    the method further comprises:
        detecting a reservation of a first or a second resource by a thread;
        recording the reservation by the corresponding thread on the corresponding resource in the reservation record; and
        identifying the resource reserved by the thread further comprises: for respective threads, identifying at least one resource reserved by the thread according to the reservation record.

3. The method of claim 2, wherein recording the reservation in the reservation record further comprises: recording the reservation of the first resource or the second resource in the reservation record before awarding the reservation of the corresponding resource to the thread.

4. The method of claim 2, wherein further comprises: after detecting the thread relinquishing the reservation of the first or second resource, removing the reservation of the corresponding resource from the reservation record.

5. The method of claim 2, wherein recording the reservation further comprises: recording the reservation by the thread on the corresponding resource only if at least one other thread has requested the corresponding resource.

6. The method of claim 2, wherein detecting the resource conflict comprising a delayed release of the reservation of the second resource by the execution of the fourth thread while the request for the second resource by the first thread comprises: examining the reservation record store to detect the fourth thread having a reservation on the selected resource.

7. The method of claim 6, wherein:
    the reservation record further comprises a forest of binary trees; and
    the method further comprises:
        detecting an imbalance in a binary tree comprising the reservation record; and
        rebalancing the binary tree.

8. The method of claim 7, wherein the binary tree further comprises a partitioned red/black tree.

9. The method of claim 2, wherein the reservation record further comprises, for each of the first and second resources, a reservation list of threads using the respective resource.

10. The method of claim 2, wherein detecting the reservation of the corresponding resource by the thread further comprises: recording the reservation by the thread on the corresponding resource in the reservation record upon context switching away from the thread.

11. The method of claim 1, wherein elevating the priority of the third thread further comprises, responsive to context-switching away from the first thread:
    identifying the corresponding resource awaited by the first thread; and
    identifying the corresponding thread that has reserved the corresponding resource;

identifying the second thread having a priority that is below the priority of the first thread and above the priority of the third thread; and elevating the priority of the third thread above the second thread.

12. The method of claim 1, wherein elevating the priority of the third thread further comprises: setting the priority of the third thread at least as high as the priority of the first thread.

13. The method of claim 1, wherein elevating the priority of the third thread further comprises:
detecting an adjustment of the priority of the first thread after elevating the priority of the third thread; and
adjusting the priority of the third thread according to the adjustment of the priority of the first thread.

14. The method of claim 1, wherein elevating the priority of the third thread further comprises:
detecting the third thread relinquishing the reservation of the resource; and
reducing the priority of the third thread.

15. The method of claim 1, wherein:
respective resources are accessed according to a resource access type;
respective threads further comprise at least two resource access type priorities respectively identifying a priority of the thread for accessing resources according to a resource access type; and
elevating the priority of the thread further comprises: elevating for the thread the resource access type priority for the resource access type of the corresponding resource.

16. The method of claim 15, wherein elevating the priority of the thread further comprises: elevating for the thread for a second resource access type priority for a second resource access type that is not associated with the selected resource.

17. The method of claim 1, wherein elevating the priority of the third thread further comprises:
identifying that the third thread is awaiting the second resource that is reserved by the fourth thread having a priority below the priority of the second thread; and
elevating the priority of the fourth thread above the priority of the second thread.

18. The method of claim 1, wherein elevating the priority of the third thread further comprises:
elevating the priority of a first operation of the third thread that involves the first resource; and
refraining from elevating the priority of a second operation of the third thread that does not involve the first resource.

19. A computer program product comprising one or more hardware storage devices having stored thereon computer-executable instructions that are structured such that, when executed by one or more processors of a computing system, the computer-executable instructions cause the computing system to prioritize a plurality of threads, including at least a first thread, a second thread, a third thread, and a fourth thread, each of which is owned by a process and available for being scheduled to be executed on the processor of the computing system and has a respective priority, the priority of the first thread being higher than the priority of the second thread, the priority of the second thread being higher than the priority of the third thread, and the priority of the third thread being higher than the priority of the fourth thread, the instructions comprising instructions that are executable to cause the computing system to perform at least the following:

allocate a reservation of a first resource to the third thread;
during the reservation of the first resource by the third thread, receive a request from the fourth thread for the first resource;
allocate a reservation of a second resource to the fourth thread;
during the reservation of the second resource to the fourth thread, receive a request from the first thread for the second resource;
detect a resource conflict comprising a delayed release of the reservation of the second resource by the execution of the fourth thread while the request for the second resource by the first thread is pending; and
address the resource conflict by:
temporarily elevating the priority of the third thread to a priority that is higher than the priority of the second thread, such that the third thread is scheduled to be executed prior to the second thread;
in response to the third thread relinquishing the first resource, temporarily elevating the priority of the fourth thread to a priority that is higher than the priority of the second thread, such that the fourth thread is scheduled to be executed prior to the second thread; and
in response to the fourth thread relinquishing the second resource, scheduling the first thread to be executed prior to the second thread.

20. A computing system that executes a plurality threads, including at least a first thread, a second thread, a third thread, and a fourth thread, each of which is owned by a process and available for being scheduled to be executed by the computing system and has a respective priority, the priority of the first thread being higher than the priority of the second thread, the priority of the second thread being higher than the priority of the third thread, and the priority of the third thread being higher than the priority of the fourth thread, comprising:
a processor; and
a memory having stored thereon computer-executable instructions that are executable by the processor to cause the computing system to prioritize the first thread, the second thread, the third thread, and the fourth thread, the instructions including instructions that are executable to cause the computing system to perform at least the following:
allocate a reservation of a first resource to the third thread;
during the reservation of the first resource by the third thread, receive a request from the fourth thread for the first resource;
allocate a reservation of a second resource to the fourth thread;
during the reservation of the second resource to the fourth thread, receive a request from the first thread for the second resource;
detect a resource conflict comprising a delayed release of the reservation of the second resource by the execution of the fourth thread while the request for the resource by the first thread is pending; and
address the resource conflict by:
temporarily elevating the priority of the third thread to a priority that is higher than the priority of the second thread, such that the third thread is scheduled to be executed prior to the second thread;
in response to the third thread relinquishing the first resource, temporarily elevating the priority of the fourth thread to a priority that is higher than the priority of the second thread, such that the fourth thread is scheduled to be executed prior to the second thread; and in response to the fourth thread relinquishing the second resource, scheduling the first thread to be executed prior to the second thread.

\* \* \* \* \*